United States Patent Office 3,167,787
Patented Feb. 2, 1965

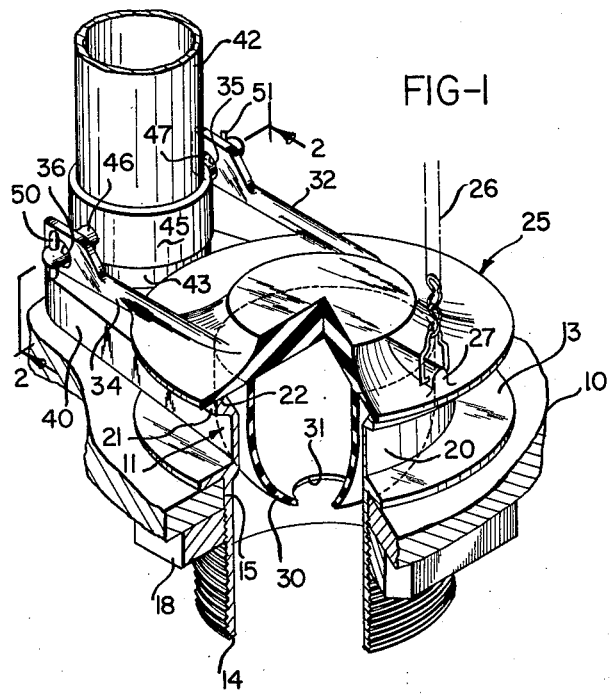

3,167,787
PIVOTED VALVE MOUNTING ASSEMBLY
Hugh McDermott Connealy, Los Angeles, Calif.
(155 E. 157th St., Gardena, Calif.)
Filed Aug. 30, 1963, Ser. No. 305,686
3 Claims. (Cl. 4—58)

This invention relates to valves, particularly valve members and pivotal mountings therefor. The invention is particularly adapted to utilization in connection with outlet valves for water closet flush tanks or the like and the exemplary embodiment disclosed herein will be described with reference to that application of the invention.

The primary object of the invention is to provide a simplified valve closure member and pivotal mounting means therefore, particularly adapted for use with outlet valves of water closet flush tanks and possessing the characteristic that the valve closure member and mounting means may be assembled or mounted by persons without skill, and possessing the further characteristic that the mounting means can readily be mounted or assembled with different types of outlet fittings and/or structures, as will appear more in detail hereinafter.

Ordinarily flush tanks are provided with an outlet fitting in the bottom thereof providing a valve seat, this fitting usually being provided with an upstanding overflow pipe as an integral part thereof. In a preferred form of the invention as described herein, the mounting means for the valve closure member is simply a bushing having integral extending trunnions which can be mounted simply by slipping it over the overflow pipe. The valve closure member is preferably resilient, being made of rubber or the like, having extended apertured arms which fit over the trunnions on the bushing. This construction of the valve closure member and its mounting means is extremely versatile, adapting it for being mounted and used with different types of fittings utilized in the flush tank. The said fitting as commercially available, may be of a type in which the overflow pipe has integral extending trunnions, or it may be provided with a separate part fitted thereon having integral extending trunnions. In such event, the valve closure member of the invention as described herein is readily adaptable to assembly therewith merely by fitting the apertured arms of the valve closure member over the said trunnions. In this event the bushing with its trunnions is not used. On the other hand, the aforesaid fitting in the flush tank may be of another type wherein the overflow pipe is provided at the lower part thereof with integral sockets adapted to receive extending pins or projections on the ends of arms extending from a valve closure member. The invention as described herein is readily adaptable also to this type of commercial fitting. To adapt to this fitting, the said bushing which is made of rubber and is resilient, is merely fitted over the lower part of the drain pipe over the aforesaid sockets; the extending trunnions are then utilized as before to mount the valve closure member thereon. The said rubber bushing may be provided with projections or bosses on the interior thereof adapted to fit into sockets on flush tank fittings of the type wherein such sockets are provided at the lower part of the overflow tube assembly. A further object of the invention is, therefore, to provide a valve closure member and mounting means having the capabilities and versatility of utilization as pointed out in this paragraph.

Further objects and additional advantages of the invention will become apparent from the following detailed description and annexed drawings wherein:

FIGURE 1 is a perspective partly cut away view of a preferred form of the invention;
FIGURE 2 is a sectional view taken along the line 2—2 of FIGURE 1;
FIGURE 3 is a perspective view of the mounting bushing of the invention;
FIGURE 4 is a perspective view partly cut away of another form of valve seat and overflow pipe fitting, with the invention adapted thereto;
FIGURE 5 is a perspective view of a modified form of bushing;
FIGURE 6 is a perspective view partly cut away of another modified form of valve seat and overflow pipe fitting, with the invention adapted thereto;
FIGURE 7 is a cross-sectional view taken along the line 7—7 of FIGURE 6.

Referring now more particularly to FIGURE 1 of the drawings, this figure shows a typical form of outlet valve and overflow pipe fitting such as may be used commercially in water closet flush tanks. Numeral 10 designates the bottom wall of the flush tank. The fitting is designated generally by the numeral 11. It comprises a flange 13 which is disposed against the bottom wall of the flush tank and an extending threaded neck 14 which extends through an opening 15 in the bottom of the flush tank. The fitting is held in position by means of a nut 18 threaded onto the stem or neck 14 and against the bottom of the flush tank.

The upper part of the fitting, as designated at 20, has an extending circular lip 21 which forms a valve seat 22 for the valve closure member 25. This member is operated in the usual manner by way of a chain 26 connected to a lug 27 on the valve closure member.

The valve closure member 25 is circular or disc shape as shown, and may preferably be formed of rubber and is resilient. At its lower side it has an extending ball-like portion 30 which is hollow and has a bottom opening 31 in it. The valve closure member has a pair of integral extending arms 32 and 34, the ends of which are apertured as indicated at 35 and 36.

The fitting 11 has an integral part extending to one side as designated at 40 which in the form of the invention shown is rectangular in cross-section, as may be seen in FIGURE 2. This part is hollow as shown and communicates with the bore or interior of the fitting 11. The part 40 has integrally extending upwardly therefrom the overflow pipe 42, there being a part of slightly larger diameter 43 at the base of the overflow pipe 42.

In the preferred form of the invention, means are provided for mounting the valve closure member 25 and preferably this means takes the form of a bushing, as shown in FIGURE 3. This bushing is preferably made of rubber and is resilient, being in the form of a ring, as shown at 45. It has integral extending trunnions 46 and 47 made of the same material and these trunnions may have integral transversely extending pin-like members 50 and 51 at their ends.

The valve closure member 25 is mounted in the manner illustrated in FIGURE 1. The bushing 45 being resilient is simply slipped over the overflow pipe 42 into the position as shown in FIGURE 1. This may be done by anyone, this assembly operation not requiring skill. The apertured ends of the arms 32 and 34 are deformable and are fitted over the ends of the trunnions 46 and 47 and their transverse extending members 50 and 51 which may be omitted entirely if desired. With the bushing mounted as described and the valve closure member 25 assembled on it, the closure member is pivotally mounted and is operable in a conventional manner in response to the pull chain 26.

FIGURE 4 of the drawings shows the adaptability of the invention to another type of valve outlet fitting. This outlet fitting is similar to that of FIGURE 1, but is different in certain respects. Those parts that are the same or similar are identified by the same reference numerals. The overflow pipe 42 in FIGURE 4 fits inside of a bushing 55 integrally formed with the extending part 40 of the fitting 11'. This bushing has integral extending trunnions 56 and 57 which extend from bosses 59 and 60 formed on diametrically opposed sides of the bushing 55. At the ends of the trunnions 56 and 57 are button formations 63 and 64.

The herein invention is equally adaptable to use with this type of fitting. With this type of fitting the bushing 45 is not used. Instead the extending arms 32 and 34 of the closure member 25 are simply fitted over the buttons 63 and 64 on the ends of the trunnions 56 and 57.

In this manner the valve closure member 25 is pivotally mounted on the fitting for operation in the same manner as described in connection with FIGURE 1.

FIGURE 6 illustrates another type of commercially available valve outlet fitting. This fitting has an extending part 40 with an integral bushing 55' which mounts the overflow pipe in the same manner as illustrated in FIGURE 4. The bushing 55' has integral bosses formed in its sides in a position diametrically opposed from each other as indicated at 70. These bosses have depressions or openings providing cavities as shown at 71. The invention as described herein is adapted for use with this type of fitting in a manner similar to that of its use, as described in connection with FIGURES 1 and 4. The bushing 45' may be simply mounted around the bushing 55' and stretched around the bosses as shown at 69 and 70 to provide extending trunnions for mounting the arms 32 and 34 of the valve closure member. FIGURE 5 shows a slightly modified, preferred form of bushing which is different than the one shown in FIGURE 3 in that on the inside of it there are provided projections or bosses as designated at 72 and 73 which are of a size and positioned to be received in the sockets formed by the bosses as shown at 69 and 70 on the bushing 55' of FIGURE 6. The bushing 45' is assembled around the base part of the overflow tube of the fitting shown in FIGURE 6, as illustrated in FIGURE 7. Since the bushing 45' is resilient, it may readily be fitted over the overflow pipe and stretched around the bushing 55' with the projections 72 and 73 fitted into the sockets as shown at 69 and 70.

From the foregoing, those skilled in the art will understand and appreciate the structure of the invention and its manner of use. It will be observed that it achieves and realizes all of the objects and advantages enumerated in the foregoing as well as having many additional advantages that are apparent from the detailed description. The invention provides an extremely simple and easy to fabricate closure member, and mounting means therefor. The assembly has the characteristics of great utility and versatility, in addition to being very economical and extremely easy to install and use.

The foregoing disclosure is representative of preferred forms of the invention and is to be interpreted in an illustrative rather than a limiting sense, the invention to be accorded the full scope of the claims appended hereto.

I claim:

1. In valve closure means for use with a flush tank or similar tank having an outlet opening and an upstanding drainpipe, the improvement comprising: a valve closure member; a first pair of elements in the form of arms extending integrally from the valve closure member; a bushing having a second pair of diametrically opposed elements extending therefrom in the form of trunnions, said bushing being resilient and of a size to be mounted about the lower part of the drainpipe; said first pair of elements having apertures adjacent their ends and pivotally embracing said trunnions; said pairs of elements being resilient whereby said valve closure may be selectively released from said bushing; and at least one lateral projection adjacent the ends of said trunnions to prevent inadvertent removal of said arms.

2. A structure as defined in claim 1 wherein said bushing has integral diametrically opposed internal projections.

3. A structure as defined in claim 2 in combination with a drainpipe having diametrically opposed cavities therein, said internal projections being seated in said cavities.

References Cited in the file of this patent

UNITED STATES PATENTS

| | | |
|---|---|---|
| 2,142,393 | Halteman | Jan. 3, 1939 |
| 2,763,872 | Nelson | Sept. 25, 1956 |
| 2,767,406 | Bennett | Oct. 23, 1956 |
| 2,779,028 | Branch | Jan. 29, 1957 |
| 2,821,721 | Nelson | Feb. 4, 1958 |
| 2,970,319 | Lassiter | Feb. 7, 1961 |